(12) United States Patent
Jeong et al.

(10) Patent No.: US 9,243,832 B2
(45) Date of Patent: Jan. 26, 2016

(54) APPARATUS AND METHOD FOR CONTROLLING A COMPRESSOR, AND REFRIGERATOR COMPRISING SAME

(75) Inventors: Sangsub Jeong, Seoul (KR); Jongkwon Kim, Seoul (KR); Boram Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 13/808,370

(22) PCT Filed: Jul. 5, 2011

(86) PCT No.: PCT/KR2011/004917
§ 371 (c)(1),
(2), (4) Date: Jan. 4, 2013

(87) PCT Pub. No.: WO2012/005498
PCT Pub. Date: Jan. 12, 2012

(65) Prior Publication Data
US 2013/0139536 A1     Jun. 6, 2013

(30) Foreign Application Priority Data

Jul. 6, 2010 (KR) .................... 10-2010-0065079

(51) Int. Cl.
*H02K 7/14* (2006.01)
*F25B 49/02* (2006.01)
*F04B 35/04* (2006.01)
*F04B 23/00* (2006.01)
*F04B 49/06* (2006.01)

(52) U.S. Cl.
CPC .............. *F25B 49/022* (2013.01); *F04B 23/00* (2013.01); *F04B 35/045* (2013.01); *F04B 49/06* (2013.01); *F25B 49/025* (2013.01); *F25B 2600/021* (2013.01); *Y02B 30/741* (2013.01)

(58) Field of Classification Search
CPC ...................................................... F25B 49/022
USPC ................................................ 318/3, 34, 558
See application file for complete search history.

(56) References Cited

U.S. PATENT DOCUMENTS 5,628,202 A * 5/1997 Lee et al. ..................... 62/228.5
6,040,679 A * 3/2000 Monk ....................... H02P 1/44
                                                318/766

(Continued)

FOREIGN PATENT DOCUMENTS

| KR | 10-2004-0023546 | 3/2004 |
| KR | 10-2005-0115482 | 12/2005 |
| KR | 10-2006-0081439 | 7/2006 |

OTHER PUBLICATIONS

Chinese Office Action dated Jul. 8, 2014, issued in Application No. 201180035584.0 (with Korean translation).

(Continued)

*Primary Examiner* — David S Luo
(74) *Attorney, Agent, or Firm* — Ked & Associates, LLP

(57) ABSTRACT

The present invention relates to an apparatus for controlling a compressor, to a method for controlling a compressor and to a refrigerator comprising same. According to certain embodiments of the present invention, a compressor operates selectively in a TRIAC driving mode or in a mode in which commercial power is directly used in accordance with the quality of the electricity of the commercial power. According to certain embodiments of the present invention, the commercial power is directly applied to the compressor within the range of a predetermined voltage or frequency so as to reduce or remove losses caused by the TRIAC driving, and power consumption is reduced to improve energy efficiency.

12 Claims, 6 Drawing Sheets

(56) References Cited

U.S. PATENT DOCUMENTS

| | | | |
|---|---|---|---|
| 6,289,680 B1 * | 9/2001 | Oh et al. | 62/6 |
| 6,407,530 B1 * | 6/2002 | Kwon et al. | 318/778 |
| 2009/0208347 A1 | 8/2009 | Heo | 417/44.1 |

OTHER PUBLICATIONS

International Search Report issued in PCT Application No. PCT/KR2011/004917 dated Feb. 28, 2012.

\* cited by examiner

APPARATUS AND METHOD FOR CONTROLLING A COMPRESSOR, AND REFRIGERATOR COMPRISING SAME

TECHNICAL FIELD

The present disclosure relates to a compressor and a refrigerator having the same, and more particularly, an apparatus and method for controlling a compressor, capable of operating a compressor by using commercial power directly for the compressor according to the quality of electricity of the commercial power, and a refrigerator having the same.

BACKGROUND ART

In general, a refrigerator is equipment used for keeping stuffs such as foods, beverages and the like in a fresh state for a long term of time, and stores the stuffs in a refrigerated or frozen state according to a type of the stuff.

A refrigerator is driven by an operation of a compressor disposed therein. Cold air supplied into the refrigerator is generated by heat exchange of a refrigerant. The refrigerant is continuously supplied into the refrigerator by a repetitive performance of a cycle of compression-condensation-expansion-evaporation. The refrigerant supplied into the refrigerator is evenly transferred into the refrigerator by convection, such that foods within the refrigerator can be stored at a desired temperature.

Meanwhile, the refrigerator or an air conditioner is equipped with a compressor, and generally uses a brushless direct current (BLDC) compressor or a reciprocating compressor.

Especially, a reciprocating compressor is a compressor in which a piston linearly reciprocates within a cylinder so as to suck, compress and discharge a refrigerant gas. The reciprocating compressors are classified into a recipro type and a linear type according to a method of driving a piston.

The recipro type is employing a method of converting a rotational force of a rotary motor into a linear reciprocating motion by coupling a crankshaft to the rotary motor and a piston to the crankshaft. On the other hand, the linear type is employing a method of reciprocating a piston in response to a linear motion of a linear motor by directly connecting the piston to a mover of the linear motor. The linear type reciprocating compressor exhibits a less frictional loss due to non-use of a crankshaft, which is used to convert the rotating motion into the linear motion. Therefore, the linear type reciprocating compressor has higher compression efficiency than typical compressors.

A refrigerator having a compressor includes a compressor controller for controlling an operation of the compressor and a refrigerator controller for controlling an operation of the refrigerator. Here, the compressor controller detects current and voltage flowing in the compressor and controls stroke or speed using the detected current and voltage. The refrigerator controller controls power of the compressor by outputting a control signal for turning on or off the compressor to the compressor controller according to a refrigerator load, for example, an inner temperature of the refrigerator, and drives the refrigerator accordingly.

In a refrigerator having a linear compressor or a BLDC reciprocating compressor, the compressor receives commercial power and operate via a drive (or driving unit) implemented as a power source such as a TRIAC and the like. The compressor carries out operations, such as power on/off, freezing (cooling) capacity variation, speed control, frequency control, stroke control and the like, according to a command required in the refrigerator. The refrigerator maintains the inner temperature within an appropriate level through the operations of the compressor.

However, in an apparatus and method for controlling a compressor and a refrigerator having the same according to the related art, since the compressor is always driven via a drive implemented as a TRIAC, there is a problem in a loss due to the drive.

DISCLOSURE OF THE INVENTION

Therefore, to obviate those problems, an aspect of the detailed description is to provide an apparatus and method for controlling a compressor capable of driving (or operating) the compressor via a TRIAC or connecting a commercial power (source) directly into the compressor according to the quality of electricity of the commercial power, namely, wall cube, and a refrigerator having the same.

Another aspect of the detailed description is to provide an apparatus and method for controlling a compressor capable of reducing or removing losses caused due to a compressor drive, such as a TRIAC, by supplying commercial power directly to the compressor within a predetermined voltage range or a predetermined range of frequency of the commercial power, and a refrigerator having the same.

To achieve these and other advantages and in accordance with the purpose of the present invention, as embodied and broadly described herein, there is provided an apparatus for controlling a compressor including a commercial power source to supply power to the compressor, a TRIAC driven by a gate driving signal to operate the compressor, a switching unit to connect the TRIAC to the compressor in response to a control signal or the commercial power source directly to the compressor, and a compressor controller to drive the TRIAC by generating the gate driving signal, and open or close the switching unit by generating the control signal based on an input voltage or an input frequency of the commercial power source.

In accordance with the apparatus for controlling the compressor according to one exemplary embodiment, the compressor controller may generate a control signal to connect the commercial power source directly to the compressor when the input voltage of the commercial power source is within a preset voltage range or the input frequency of the commercial power source is within a preset frequency range.

The compressor controller may have a plurality of operation modes, and the apparatus may further include a capacitor circuit formed to have a capacitance corresponding to an inductance of a coil wound on the motor according to the operation mode. Here, the capacitor circuit may include at least one capacitor, and a second switching unit to selectively connect the at least one capacitor to the compressor.

In accordance with the apparatus for controlling the compressor according to one exemplary embodiment, the motor may include two or more tabs to which the capacitor circuit is connected according to the operation mode.

The apparatus for controlling the compressor according to one exemplary embodiment may further include a voltage detecting unit to detect the input voltage of the commercial power source, and a frequency detecting unit to detect the input frequency of the commercial power source.

To achieve these and other advantages and in accordance with the purpose of the present invention, as embodied and broadly described herein, there is provided a refrigerator including a commercial power source to supply power to the refrigerator and a compressor, a TRIAC driven by a gate driving signal to operate the compressor, a compressor controller open or closed in response to a first control signal, the compressor controller driving the TRIAC by generating the gate driving signal, a switching unit to connect the TRIAC to the compressor or the commercial power source directly to the compressor in response to a second control signal, and a refrigerator controller to open or close the compressor controller by generating the first control signal, and open or close the switching unit by generating the second control signal based on an input voltage or an input frequency of the commercial power source.

In accordance with the refrigerator according to one exemplary embodiment, the refrigerator controller may generate a second control signal to connect the commercial power source directly to the compressor when the input voltage of the commercial power source is within a preset voltage range or the input frequency of the commercial power source is within a preset frequency range.

The refrigerator controller may have a plurality of operation modes for operating the controller, and the refrigerator may further include a capacitor circuit formed to have a capacitance corresponding to an inductance of a coil wound on the motor according to the operation mode. Here, the capacitor circuit may include at least one capacitor, and a second switching unit to selectively connect the at least one capacitor to the compressor.

In accordance with the refrigerator according to one exemplary embodiment, the refrigerator controller may generate a first control signal to cut off power of the compressor controller when the input voltage of the commercial power source is within a preset voltage range or the input frequency of the commercial power source is within a preset frequency range.

To achieve these and other advantages and in accordance with the purpose of the present invention, as embodied and broadly described herein, there is provided a method for controlling a compressor including detecting an input voltage of a commercial power source for supplying power to the compressor, determining whether or not the detected input voltage is within a preset voltage range, and operating the compressor based on the determination result.

The operating the compressor may be carried out to operate the compressor by connecting the commercial power source directly to the compressor when the detected input voltage is within the voltage range.

The operating the compressor may be carried out to operate the compressor via a TRIAC when the detected input voltage is out of the voltage range.

In accordance with another exemplary embodiment of the present disclosure, there is provided a method for controlling a compressor including detecting an input frequency of a commercial power source for supplying power to the compressor, determining whether or not the detected input frequency is within a preset frequency range, and operating the compressor based on the determination result.

The operating the compressor may be carried out to operate the compressor by connecting the commercial power source directly to the compressor when the detected input frequency is within the frequency range.

The operating the compressor may be carried out to operate the compressor via a TRIAC when the detected input frequency is out of the frequency range.

Advantageous Effect

In an apparatus and method for controlling a compressor and a refrigerator having the same according to exemplary embodiments of the present disclosure, the compressor may be operated by selectively using a TRIAC driving mode or a mode in which commercial power source is directly used according to the quality of electricity of the commercial power source.

In the exemplary embodiments of the present disclosure, the commercial power may be directly introduced into the compressor within a preset voltage or frequency range so as to reduce or remove the losses caused due to the TRIAC driving.

Also, power consumption can be reduced to improve energy efficiency and harmonic generation and distortion of a power factor due to the TRIAC driving can be reduced.

MODES FOR CARRYING OUT THE PREFERRED EMBODIMENTS

Figure 1:
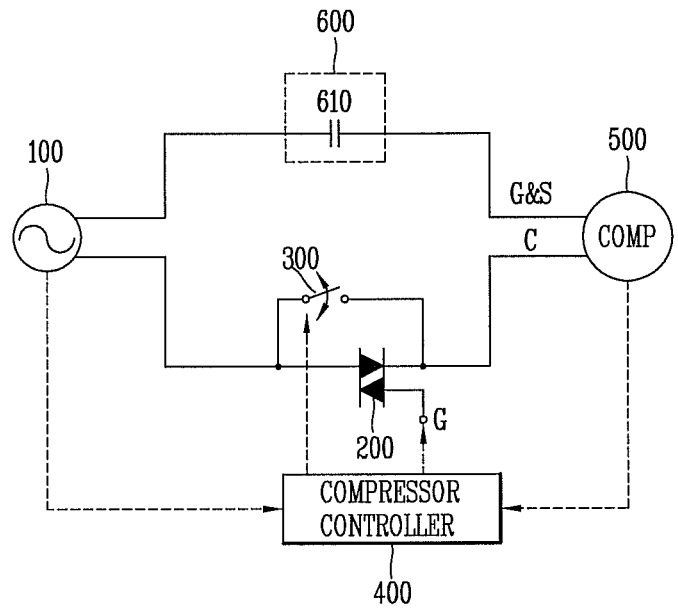
FIGS. 1 to 6 are block diagrams each schematically showing a configuration of an apparatus for controlling a controller in accordance with exemplary embodiments.

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

As shown in FIGS. 1 to 6, a compressor control apparatus in accordance with one exemplary embodiment may include a commercial power source 100 for supplying power to a compressor 500, a TRIAC 200 for driving the compressor 500 in response to a gate driving signal, a switching unit 300 for connecting the TRIAC 200 to the compressor 500 or connecting the commercial power source 100 directly to the compressor 500 according to a control signal, and a compressor controller (or a compressor control unit or compressor controlling unit) 400 for driving the TRIAC 200 by generating the gate driving signal and opening or closing the switching unit 300 by generating the control signal based on an input voltage or an input frequency of the commercial power source 100.

The compressor controller 400 may generate a control signal for connecting the commercial power source 100 directly to the compressor 500 when the input voltage of the commercial power source 100 is within a preset voltage range, for example, within a range of 210V to 230V or the input frequency of the commercial power source 100 is within a preset frequency range, for example, within a range of 59.7 Hz to 60.3 Hz.

The compressor controller 400 may include a plurality of operation modes. Examples of the operation modes may include an initial mode, a power-saving mode G, a safe mode S and the like. Here, the compressor control apparatus according to the present disclosure may further include a capacitor circuit 600 formed to have a capacitance corresponding to an inductance of a coil wound on the motor. That is, the number of coils may change according to the operation mode of the compressor, which causes the change in the inductance of the coil. Accordingly, the capacitance of the capacitor connected to the motor may change. Here, the capacitor circuit 600 may include at least one capacitor, and a second switching unit for selectively connecting the at least one capacitor to the compressor.

Hereinafter, description will be given of an apparatus for controlling a compressor in accordance with exemplary embodiments of the present disclosure with reference to FIGS. 1 to 6. The following configurations may be changeable if necessary.

Referring to FIG. 1, an apparatus for controlling a compressor according to one exemplary embodiment may further include a capacitor circuit 600 having a single capacitor 610. That is, FIG. 1 shows an example including one operation capacitor. The compressor controller 400 may compare an input voltage or input frequency of the commercial power source with a preset voltage range or a preset frequency range, generate a control signal for turning the switching unit 300 on when being within the range, and thusly connect the commercial power source directly to the compressor.

Figure 2:
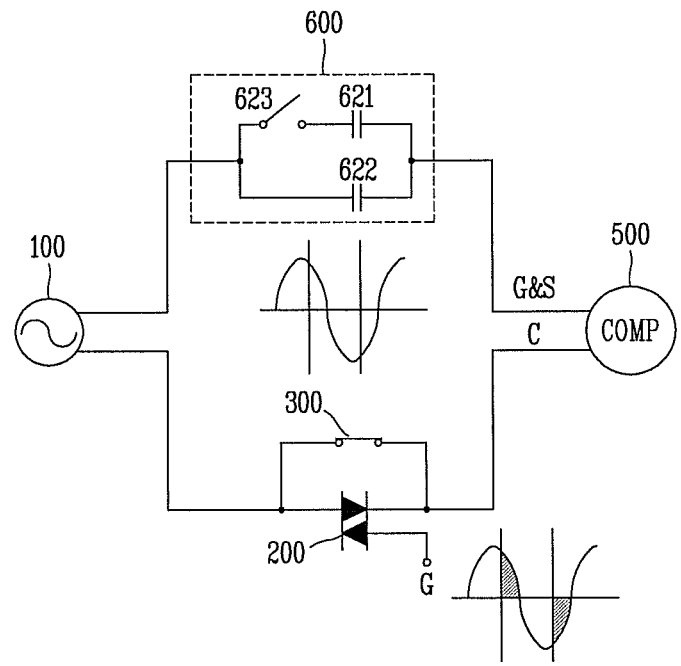

Referring to FIG. 2, an apparatus for controlling a compressor according to one exemplary embodiment may further include a capacitor circuit 600 formed to have a capacitance corresponding to an inductance of a coil wound on a motor according to an operation mode of the compressor. The capacitor circuit 600 may have two capacitors 621 and 622 connected in parallel to each other, and a second switching unit 623 connected to one capacitor (e.g., 621) in series for selectively connecting the serially connected capacitor 621 to the compressor. When an input voltage or input frequency of the commercial power source is within a preset range, the compressor controller 400 may connect the commercial power source directly to the compressor by generating a control signal for turning the switching unit 300 on, and connect only the one capacitor 622 to the compressor by turning the second switching unit 623 off. Here, the compressor may operate in a power-saving mode G. On the contrary, When the input voltage or input frequency of the commercial power source is out of the preset range, the compressor controller 400 may connect the TRIAC 200 to the compressor by generating a control signal for turning the switching unit 300 off, and carry out speed control, frequency control or stroke control by outputting a gate driving signal for driving the TRIAC 200. Also, the compressor controller 400 may connect both of the capacitors 621 and 622 to the compressor by turning the second switching unit 623 on. Here, the compressor may operate in a safe mode S.

Figure 3:
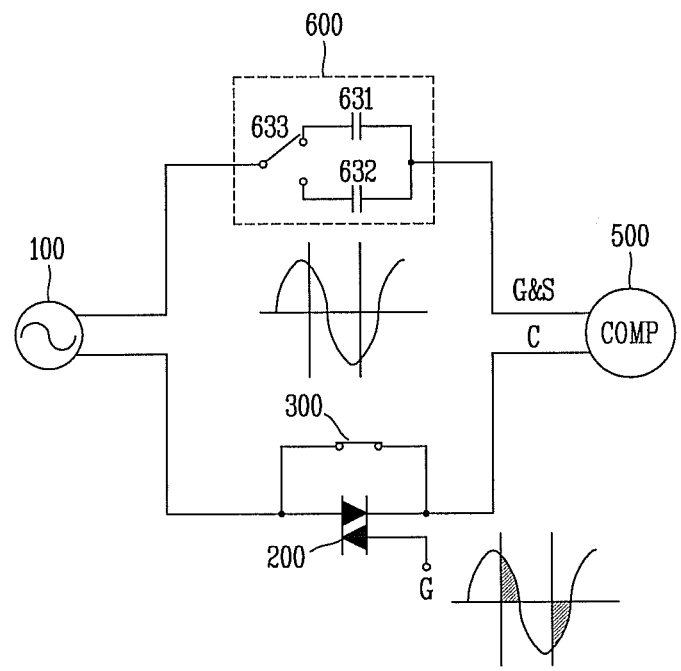

Referring to FIG. 3, an apparatus for controlling a compressor according to one exemplary embodiment may further include a capacitor circuit 600 having two capacitors 631 and 632 connected in parallel to each other and a second switching unit 633 connected to the capacitors 631 and 632 in series. When an input voltage or input frequency of the commercial power source is within a preset range, the compressor controller 400 may connect the commercial power source directly to the compressor by generating a control signal for turning the switching unit 300 on, and connect one capacitor, which has a smaller capacitance, of the two capacitors 631 and 632, to the compressor by turning the second switching unit 633 on. Here, the compressor may operate in the power-saving mode G. On the contrary, When the input voltage or input frequency of the commercial power source is out of the preset range, the compressor controller 400 may connect the TRIAC 200 to the compressor by generating a control signal for turning the switching unit 300 off and carry out speed control, frequency control or stroke control by outputting the gate driving signal for driving the TRIAC 200. Also, the compressor controller 400 may connect one capacitor, which has a larger capacitance, of the two capacitors 631 and 632, to the compressor by turning the second switching unit 633 on. Here, the compressor may operate in the safe mode S.

Figure 4:
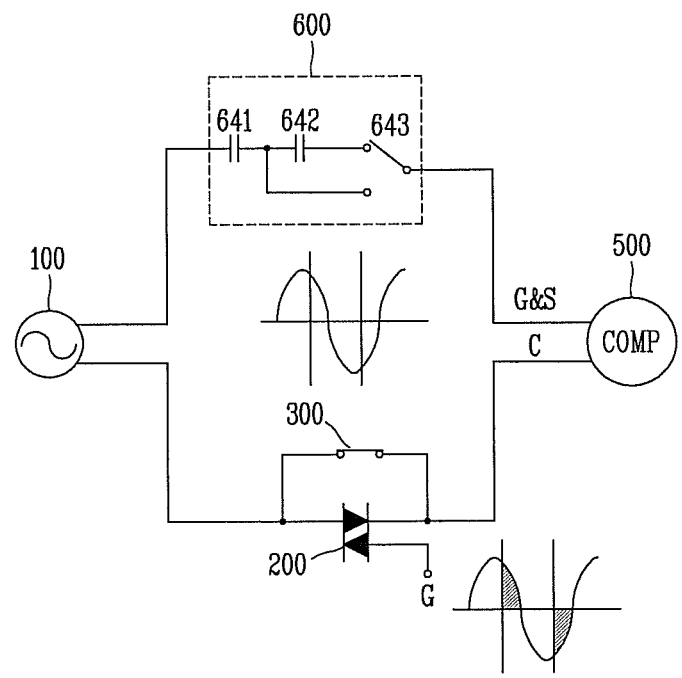

Referring to FIG. 4, an apparatus for controlling a compressor according to one exemplary embodiment may further include a capacitor circuit 600 formed to have a capacitance corresponding to an inductance of a coil wound on a motor according to an operation mode of the compressor. The capacitor circuit 600 may include two capacitors 641 and 642 connected in series to each other and a second switching unit 643 for selectively connecting the one capacitor 642 according to the operation mode. When an input voltage or input frequency of the commercial power source is within a preset range, the compressor controller 400 may connect the commercial power source directly to the compressor by generating a control signal for turning the switching unit 300 on and connect the serially connected two capacitors 641 and 642 to the compressor by activating the second switching unit 643. Here, the compressor may operate in the power-saving mode G. On the contrary, when the input voltage or input frequency of the commercial power source is out of the preset range, the compressor controller 400 may connect the TRIAC 200 to the compressor by generating a control signal for turning the switching unit 300 off and carry out speed control, frequency control or stroke control by outputting a gate driving signal for driving the TRIAC 200. Also, the compressor controller 400 may connect only the capacitor 641 without connecting the capacitor 642 by activating the second switching unit 643. Here, the compressor may operate in the safe mode S.

Figure 5:
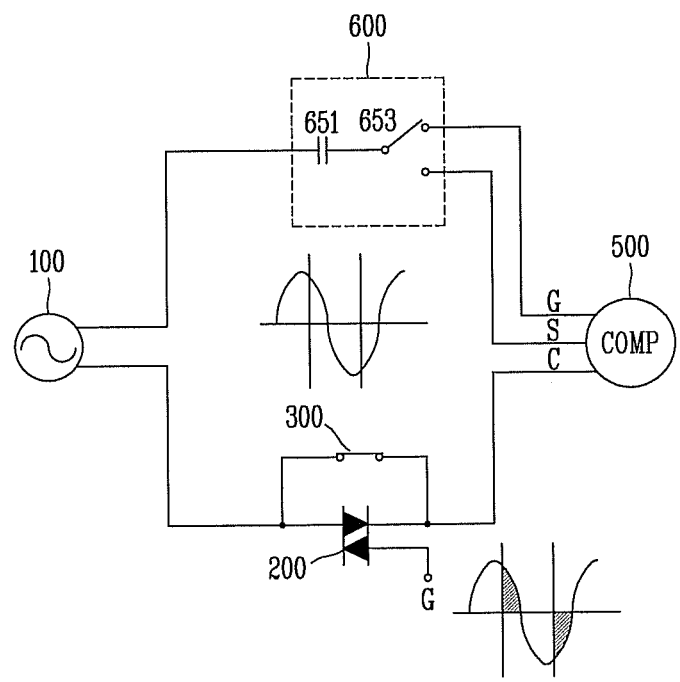

Referring to FIG. 5, an apparatus for controlling a compressor according one exemplary embodiment may include a capacitor circuit 600 formed to have a capacitance corresponding to an inductance of a coil wound on a motor according to an operation mode of the compressor. The capacitor circuit 600 may include at least one capacitor 651 and a second switching unit 653 connected to the capacitor 651 in series. Here, the second switching unit 653 may be switched on to select one of a plurality of tabs of a motor. When an input voltage or input frequency of the commercial power source is within a preset range, the compressor controller 400 may connect the commercial power source directly to the compressor by generating a control signal for turning the switching unit 300 on and connect the capacitor 651 to a power-saving mode tab (G) of the compressor by activating the second switching unit 653. On the contrary, when the input voltage or input frequency of the commercial power source is out of the preset range, the compressor controller 400 may connect the TRIAC 200 to the compressor by generating a control signal for turning the switching unit 300 off and carry out speed control, frequency control or stroke control by outputting a gate driving signal for driving the TRIAC 200. Also, the compressor controller 400 may connect the capacitor 651 to a safe mode (S) tab of the compressor by activating the second switching unit 653.

Figure 6:
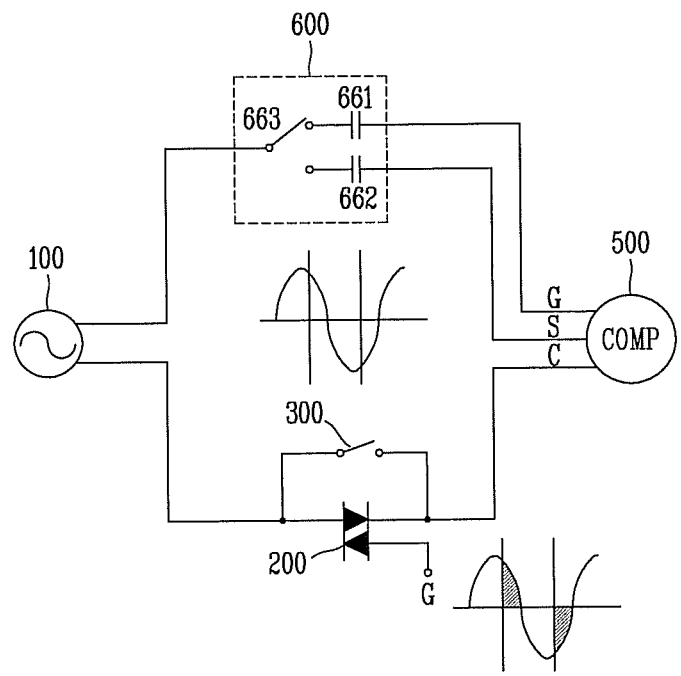

Referring to FIG. 6, an apparatus for controlling a compressor according to one exemplary embodiment may further include a capacitor circuit 600 having two capacitors 661 and 662 connected in parallel to each other and each connected to a plurality of tabs of a motor, and a second switching unit 663 for selecting one of the two capacitors 661 and 662. When an input voltage or input frequency of the commercial power source is within a preset range, the compressor controller 400 may connect the commercial power source directly to the compressor by generating a control signal for turning the switching unit 300 on and connect the capacitor 661, which has a smaller capacitance, to the power-saving mode (G) tab of the compressor by activating the second switching unit 663. On the contrary, when the input voltage or input frequency of the commercial power source is out of the preset range, the compressor controller 400 may connect the TRIAC 200 to the compressor by generating a control signal for turning the switching unit 300 off and carry out speed control, frequency control or stroke control by outputting a gate driving signal for driving the TRIAC 200. Also, the compressor controller 400 may connect the capacitor 662, which has a large capacitance, to the safe mode (S) tab of the compressor by activating the second switching unit 663.

As shown in FIG. 5 or FIG. 6, the motor equipped in the compressor may be provided with two or more tabs to which the capacitor circuit is connected according to the operation mode.

Here, the motor may be a linear motor or a brushless direct current motor (BLDC). The linear motor may not require for a mechanical converter due to self-generating a linear driving force and not have a complicated structure. Also, the linear motor may have several characteristics of reducing losses due to an energy conversion and noise by virtue of non-existence of a connected portion where friction and abrasion are caused. When the reciprocating compressor having the linear motor is applied to a refrigerator, such compressor may be advantageously used for control of a freezing capacity variation because a compression ratio can change by changing a stroke voltage applied to the linear compressor.

In the meantime, the BLDC is a motor that a brush and a commutator are removed from the DC motor and an electronic rectifier is installed in the DC motor, and has reduced mechanical electrical noise. The BLDC motor has a rotatable magnet at its center, and a driving coil wound around the magnet. Also, the BLDC motor further includes an electronic rectifier circuit without the commutator. The electronic rectifier circuit senses a position of a magnet rotor using a magnetic pole sensor such as a hall sensor or the like.

The apparatus for controlling the compressor according to the present disclosure may further include a voltage detecting unit (not shown) for detecting the input voltage of the commercial power source. Also, the apparatus for controlling the compressor may further include a frequency detecting unit (not shown) for detecting the input frequency of the commercial power source.

Referring to FIGS. 1 to 6, the apparatus for controlling the compressor according to those exemplary embodiments may not include the switching unit 300, and continuously turn the TRIAC 200 on such that the commercial power can be applied directly to the compressor when the input voltage of the commercial power source 100 is within the preset voltage range or the input frequency of the commercial power source 100 is within the preset frequency range. Here, the losses due to the TRIAC 200 may be caused unlike the installation of the switching unit 300.

Figure 7:
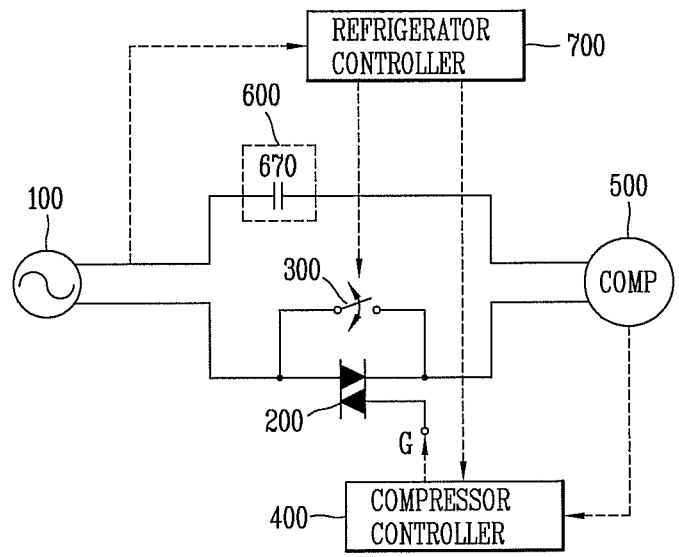
FIGS. 7 and 8 are block diagrams each schematically showing a configuration of a refrigerator in accordance with exemplary embodiments.
Figure 8:
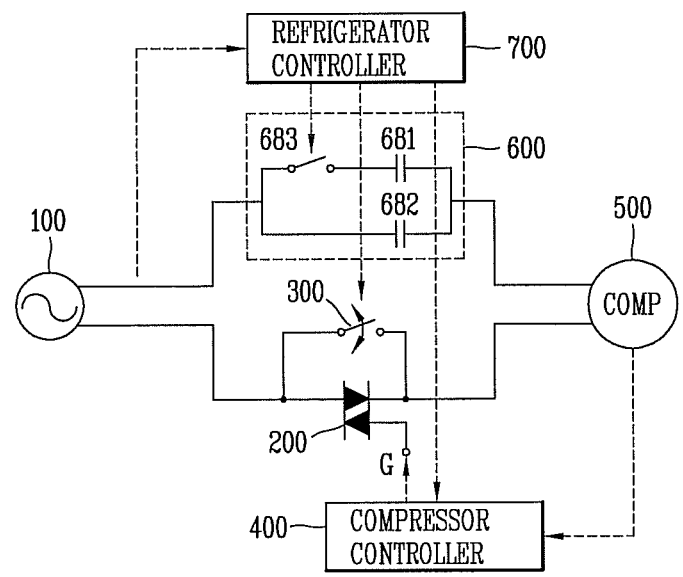

Referring to FIG. 7 or FIG. 8, a refrigerator according to one exemplary embodiment may include a commercial power source 100 for supplying power to the refrigerator and a compressor, a TRIAC 200 driven by a gate driving signal to operate the compressor, a compressor controller 400 opened or closed in response to a first control signal and configured to activate the TRIAC 200 by generating the gate driving signal, a switching unit 300 to connect the TRIAC 200 to the compressor or the commercial power source 100 directly to the compressor in response to a second control signal, and a refrigerator controller 700 to open or close the compressor controller 400 by generating the first control signal and open or close the switching unit 300 by generating the second control signal based on an input voltage or an input frequency of the commercial power source 100.

The refrigerator controller 700 may generate a second control signal for connecting the commercial power source 100 directly to the compressor when the input voltage of the commercial power source 100 is within a preset voltage range or the input frequency of the commercial power source 100 is within a preset frequency range. On the contrary, the refrigerator controller 700 may generate a second control signal for connecting the commercial power source 100 to the compressor 500 via the TRIAC 200 when the input voltage of the commercial power source 100 is out of the preset voltage range or the input frequency of the commercial power source 100 is out of the preset frequency range.

The refrigerator controller 700 may generate a first control signal for turning the compressor controller 400 off when the input voltage of the commercial power source 100 is within the preset voltage range or the input frequency of the commercial power source 100 is within the preset frequency range. That is, without the compressor controller 400 remaining in a standby state by continuously supplying power thereto, the power applied to the compressor controller 400 may be cut off, thereby reducing standby power. On the contrary, when the input voltage of the commercial power source is out of the preset voltage range or the input frequency of the commercial power source is out of the preset frequency range, the refrigerator controller 700 may apply power to the compressor controller 400 such that the compressor can carry out operations, such as power on/off, freezing capacity variation, speed control, frequency control, stroke control and the like, according to a command required in the refrigerator, and maintain inner temperature of the refrigerator within an appropriate level.

The refrigerator controller 700 may have a plurality of operation modes for operating the compressor. The operation modes, for example, may include an initial mode, a power-saving mode G, a safe mode S and the like. Here, the refrigerator according to the present disclosure may further include a capacitor circuit 600 formed to have a capacitance corresponding to an inductance of a coil wound on the motor according to the operation modes. That is, the number of coils may change according to the operation mode of the compressor, which causes the change in the inductance thereof. Accordingly, the capacitance of the capacitor connected to the motor may change. Here, the capacitor circuit 600 may include at least one capacitor, and a second switching unit for selectively connecting the at least one capacitor to the compressor.

Hereinafter, description will be given of exemplary embodiments of a refrigerator according to the present disclosure with reference to FIGS. 7 and 8. The following configurations of the refrigerator may be changeable if necessary.

Referring to FIG. 7, a refrigerator according to one exemplary embodiment may further include a capacitor circuit 600 having a single capacitor 670. That is, FIG. 7 shows an example including one operation capacitor. Here, a capacitance of the capacitor 670 may preferably have a different value according to the operation mode. The refrigerator controller 700 may compare an input voltage or input frequency of the commercial power source with a preset voltage range or a preset frequency range, generate a control signal for turning the switching unit 300 on when being within the range, and thusly connect the commercial power source directly to the compressor. Here, the refrigerator controller 700 may output a first control signal for cutting off power of the compressor controller 400.

Referring to FIG. 8, a refrigerator according to one exemplary embodiment may further include a capacitor circuit 600 formed to have a capacitance corresponding to an inductance of a coil wound on a motor according to an operation mode of the compressor. The capacitor circuit 600 may have two capacitors 681 and 682 connected in parallel to each other, and a second switching unit 683 connected to one capacitor in series for selectively connecting the serially connected capacitor 681 to the compressor. When an input voltage or input frequency of the commercial power source is within a preset range, the refrigerator controller 470 may connect the commercial power source directly to the compressor by generating a control signal for turning the switching unit 300 on, and connect only the one capacitor 682 to the compressor by turning the second switching unit 683 off. Here, the compressor may operate in the power-saving mode G. On the contrary, when the input voltage or input frequency of the commercial power source is out of the preset range, the refrigerator controller 700 may connect the TRIAC 200 to the compressor by generating a second control signal for turning the switching unit 300 off, and output a first control signal for turning the compressor controller 400 on. The compressor controller 700 may thusly carry out speed control, frequency control or stroke control by outputting a gate driving signal for driving the TRIAC 200. The refrigerator controller 700 may connect both of the capacitors 681 and 682 to the compressor by turning the second switching unit 683 on. Here, the compressor may operate in the safe mode S.

A motor disposed in the compressor may include two or more taps to which the capacitor circuit is connected according to the operation mode. Here, the motor may be a linear motor or a BLDC.

Figure 9:
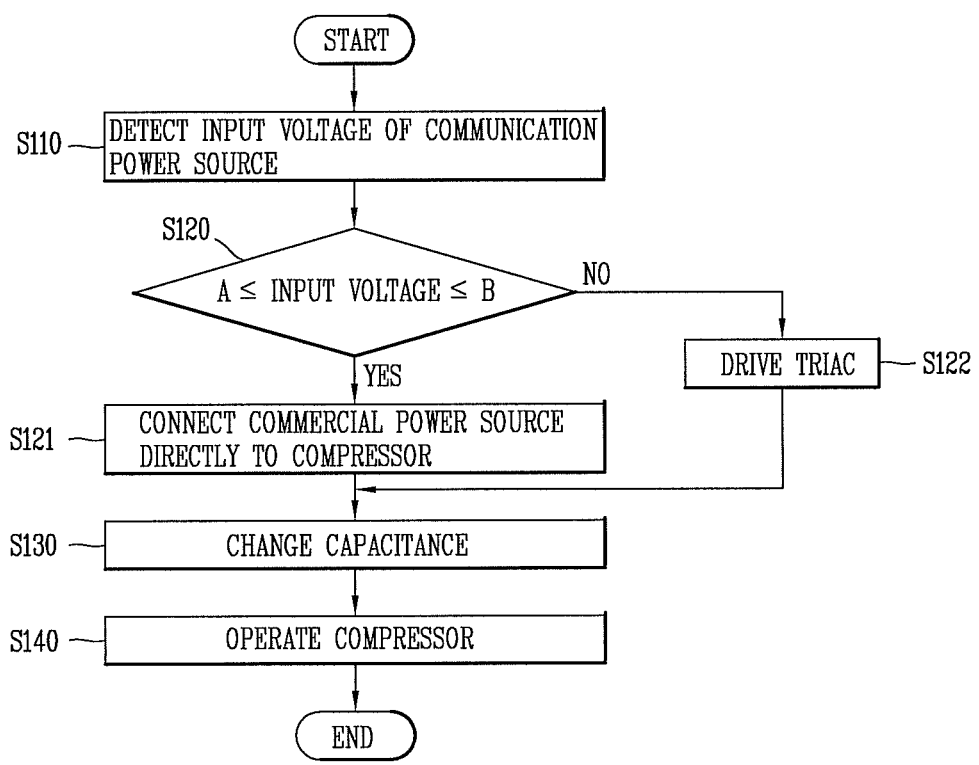
FIGS. 9 and 10 are flowcharts each schematically showing a method for controlling a compressor in accordance with exemplary embodiments.

Referring to FIG. 9, a method for controlling a compressor according to one exemplary embodiment may include detecting an input voltage of a commercial power source for supplying power to a compressor (S110), determining whether or not the detected input voltage is within a preset voltage range (S120), and operating the compressor based on the determination result.

The operating of the compressor may be carried out to operate the compressor by connecting the commercial power source directly to the compressor when the detected input voltage is within the preset voltage range (S121).

The operating of the compressor may be carried out to operate the compressor via a TRIAC when the detected input voltage is out of the preset voltage range (S122). Hereinafter, the configuration of the apparatus will be understood with reference to FIGS. 1 to 8.

The compressor controller 400 shown in FIGS. 1 to 6 or the refrigerator controller 700 shown in FIGS. 7 and 8 may operate the compressor by connecting the commercial power source directly to the compressor when the input voltage of the commercial power source is within the preset voltage range, for example, within the range of 210V to 230V ("Yes" of S120) (S121). On the contrary, the compressor controller 400 or the refrigerator controller 700 may connect the commercial power source 100 to the compressor 500 via the TRIAC 200 when the input voltage of the commercial power source is out of the preset voltage range ("No" of S120) (S122). Also, the compressor controller 400 may drive the TRIAC 200 to carry out speed control, frequency control or stroke control of the compressor (S140).

Figure 10:
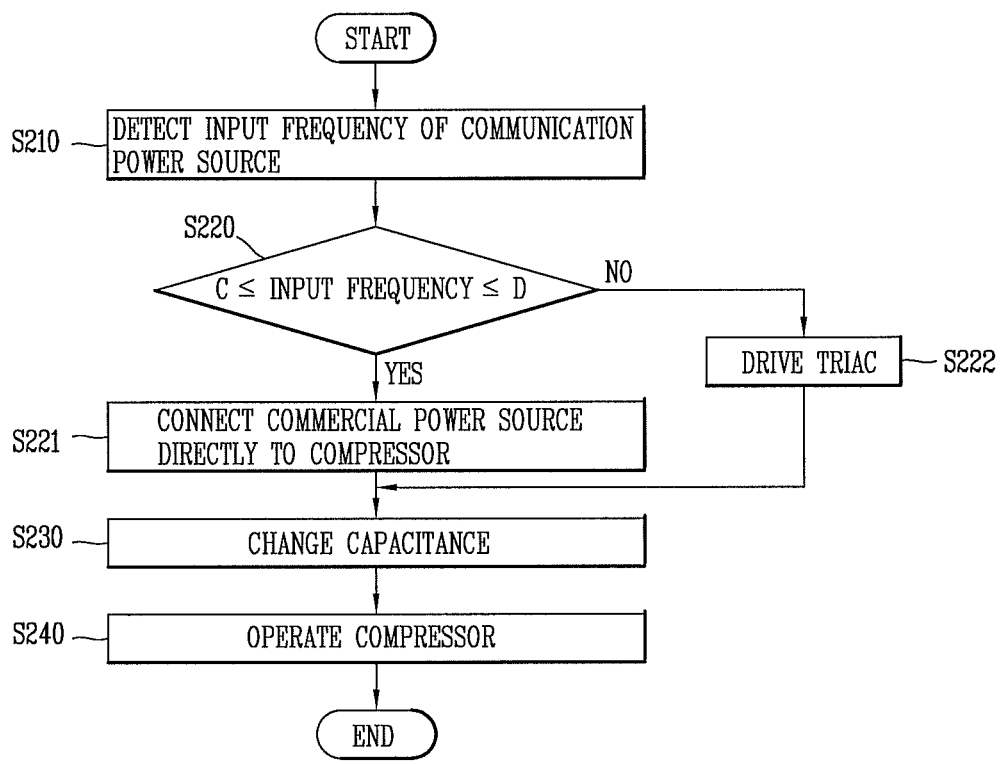

Referring to FIG. 10, a method for controlling a compressor according to one exemplary embodiment may include detecting an input frequency of a commercial power source for supplying power to a compressor (S210), determining whether or not the detected input frequency is within a preset frequency range (S220), and operating the compressor based on the determination result (S240).

The operating of the compressor may be carried out to operate the compressor by connecting the commercial power source directly to the compressor when the detected input voltage is within the preset voltage range (S221).

The operating of the compressor may be carried out to operate the compressor via a TRIAC when the detected input voltage is out of the preset voltage range (S222). Hereinafter, the configuration of the apparatus will be understood with reference to FIGS. 1 to 8.

The compressor controller 400 shown in FIGS. 1 to 6 or the refrigerator controller 700 shown in FIGS. 7 and 8 may operate the compressor by connecting the commercial power source directly to the compressor when the input frequency of the commercial power source is within the preset frequency range, for example, within the range of 59.7 Hz to 60.3 Hz ("Yes" of S220) (S221). On the contrary, the compressor controller 400 or the refrigerator controller 700 may connect the commercial power source 100 to the compressor 500 via the TRIAC 200 when the input frequency of the commercial power source is out of the preset frequency range ("No" of S220) (S222). Also, the compressor controller 400 may drive the TRIAC 200 to carry out speed control, frequency control or stroke control of the compressor (S240).

Referring to FIGS. 9 and 10, the method for controlling the compressor may further include changing a capacitance according to an operation mode of the compressor (S130 and S230). Here, the operation mode, for example, may include an initial mode, a power-saving mode G, a safe mode S and the like. Referring to FIGS. 1 to 8, when the compressor operates in the power-saving mode G, the number of coils of the motor may increase, and the capacitance of a capacitor connected to the motor may have a relatively small value so as to be driven in response to an inductance of the coil. On the other hand, when the compressor operates in the safe mode S, the number of coils of the motor may decrease and the capacitance of the capacitor may have a great value.

As described above, in an apparatus and method for controlling a compressor and a refrigerator having the same according to exemplary embodiments of the present disclosure, the compressor may operate by selectively using a TRIAC driving mode or a mode in which commercial power is directly used according to the quality of electricity of the commercial power source. In the exemplary embodiments of the present disclosure, the commercial power may be directly introduced into the compressor within a preset voltage or frequency range so as to reduce or remove the losses caused due to the TRIAC driving. Also, power consumption can be reduced to improve energy efficiency.

The invention claimed is:

1. A refrigerator comprising:
    a commercial power source to supply power to the refrigerator and a compressor;
    a TRIAC driven by a gate driving signal to operate the compressor;
    a compressor controller opened or closed in response to a first control signal, the compressor controller driving the TRIAC by generating the gate driving signal;
    a switching unit to connect the TRIAC to the compressor in response to a second control signal or the commercial power source directly to the compressor; and a refrigerator controller to open or close the compressor controller by generating the first control signal, and open or close the switching unit by generating the second control signal based on an input voltage or an input frequency of the commercial power source.

2. The refrigerator of claim 1, wherein the refrigerator controller generates a second control signal to connect the commercial power source directly to the compressor when the input voltage of the commercial power source is within a preset voltage range or the input frequency of the commercial power source is within a preset frequency range.

3. The refrigerator of claim 1, wherein the compressor is a reciprocating compressor having a linear motor or a brushless direct current (BLDC) motor.

4. The refrigerator of claim 3, further comprising a capacitor circuit formed to have a capacitance corresponding to an inductance of a coil wound on the motor according to a plurality of operation modes of the compressor, wherein the refrigerator controller has the plurality of operation modes.

5. The refrigerator of claim 4, wherein the capacitor circuit comprises:
at least one capacitor; and
a second switching unit to selectively connect the at least one capacitor to the compressor.

6. The refrigerator of claim 1, wherein the refrigerator controller generates a first control signal to cut off power of the compressor controller when the input voltage of the commercial power source is within a preset voltage range or the input frequency of the commercial power source is within a preset frequency range.

7. A method for controlling a refrigerator including a commercial power source, a compressor controller, a switching unit, a refrigerator controller and a compressor, the method comprising:
detecting an input voltage of the commercial power source for supplying power to the compressor;
determining whether or not the detected input voltage is within a preset voltage range; and
operating, by the compressor controller, the compressor based on the determination result, wherein the refrigerator controller is configured to open or close the compressor controller by generating a first control signal, and open or close the switching unit by generating a second control signal based on an input voltage or an input frequency of the commercial power source.

8. The method of claim 7, wherein the operating of the compressor is carried out to operate the compressor by connecting the commercial power source directly to the compressor when the detected input voltage is within the voltage range.

9. The method of claim 7, wherein the operating of the compressor is carried out to operate the compressor via a TRIAC when the detected input voltage is out of the voltage range.

10. A method for controlling a refrigerator including a commercial power source, a compressor controller, a switching unit, a refrigerator controller and a compressor, the method comprising:
detecting an input frequency of the commercial power source for supplying power to the compressor;
determining whether or not the detected input frequency is within a preset frequency range; and
operating, by the compressor controller, the compressor based on the determination result, wherein the refrigerator controller is configured to open or close the compressor controller by generating a first control signal, and open or close the switching unit by generating a second control signal based on an input voltage or an input frequency of the commercial power source.

11. The method of claim 10, wherein the operating of the compressor is carried out to operate the compressor by connecting the commercial power source directly to the compressor when the detected input frequency is within the frequency range.

12. The method of claim 10, wherein the operating of the compressor is carried out to operate the compressor via a TRIAC when the detected input frequency is out of the frequency range.

* * * * *